March 22, 1955     C. A. COBB     2,704,648
DIAPHRAGM OPERATED PIVOTED VALVE
Filed Jan. 31, 1952
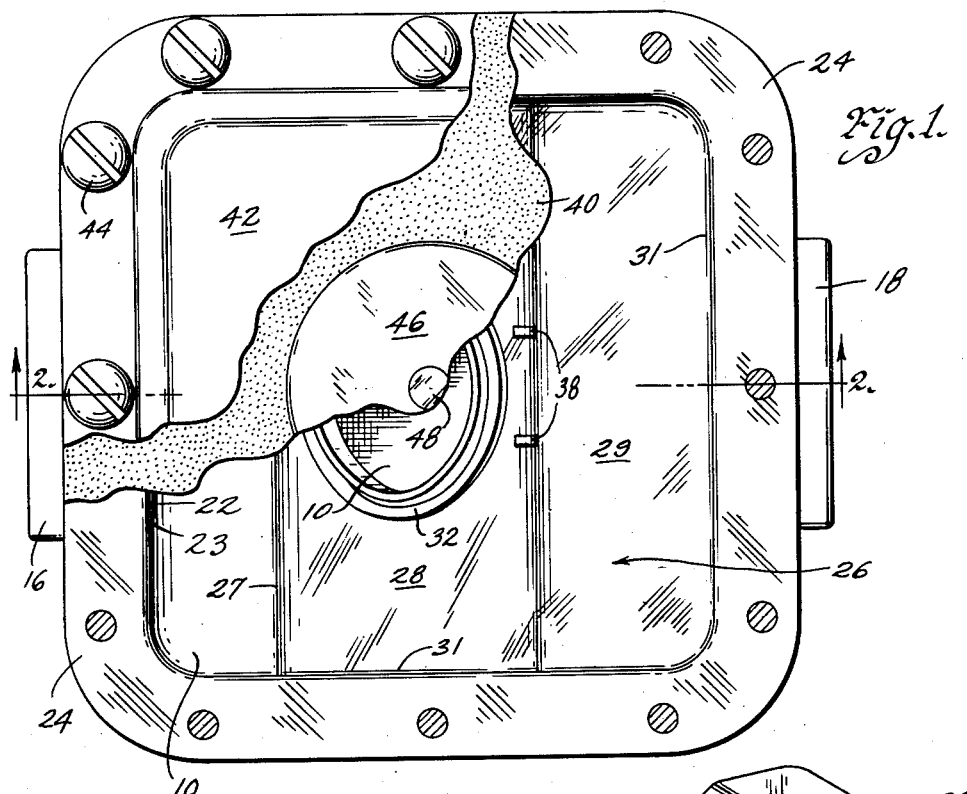
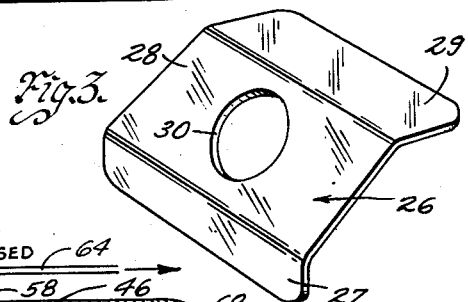
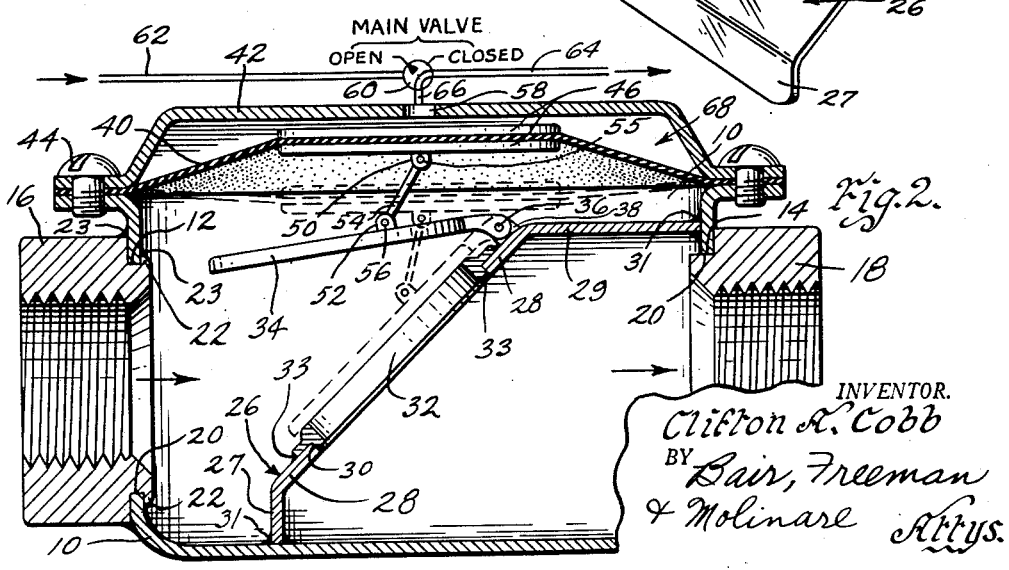
INVENTOR.
Clifton A. Cobb
BY Bair, Freeman
& Molinare Attys.

United States Patent Office 2,704,648
Patented Mar. 22, 1955

2,704,648

DIAPHRAGM OPERATED PIVOTED VALVE

Clifton A. Cobb, Goshen, Ind., assignor to Penn Controls, Inc., Goshen, Ind., a corporation of Indiana Application January 31, 1952, Serial No. 269,139

2 Claims. (Cl. 251—61)

This invention relates to a valve structure which, though particularly designed for operation in a gas supply line, is also useful for any valve wherein a body having inlet and outlet connections has a partition between the connections for supporting a valve seat.

One object of the invention is to provide a comparatively simple valve construction in which the body of the valve is formed of a stamped sheet metal cup and the connections to the line are in the form of fittings that are brazed or silver soldered thereto, a valve seat being brazed or soldered to a partition, and the partition in turn being brazed or soldered to the cup that forms the body of the valve, thus providing a fabricated valve body instead of the usual cast or die cast types and thereby eliminating the possibility of porosity often found in cast valves and other troublesome features while at the same time providing a comparatively light and substantial valve structure.

Another object of the invention is to provide a fabricated valve structure which is particularly adapted for that type of gas valve having a diaphragm (responsive to gas pressure) for controlling the flow of gas to a burner or the like.

Still another object is to provide a fabricated valve structure in which the valve seat is arranged at an angle in the valve body so that a valve gate associated therewith will (when open) permit a relatively free and unobstructed flow of gas through the valve.

A further object is to provide a valve construction in which the parts are reduced to a minimum and a comparatively simple linkage arrangement for connecting an operating diaphragm with a valve gate is provided.

Still a further object is to provide a valve structure particularly adapted for automatic closing or opening in response to gas pressure either fed into a diaphragm chamber and acting on one side of the diaphragm to close the valve or bled therefrom to open the valve, the pressure within the valve body also acting on the other side of the diaphragm and cooperating with the pressure in the top diaphragm chamber to perform the desired opening and closing operations.

With these and other objects in view, my invention consists in the construction, arrangement and combination of the various parts of my valve structure, whereby the objects contemplated are attained, as hereinafter more fully set forth, pointed out in my claims and illustrated in the accompanying drawing, wherein:

Figure 1 is a plan view of a valve structure embodying my invention, portions of the cover and of the diaphragm being broken away to show internal constructional features of the valve.

Figure 2 is a vertical sectional view on the line 2—2 of Figure 1 and showing diagrammatically a pilot valve in association with the valve structure to illustrate its use as a control valve for a gas burner or the like; and Figure 3 is a perspective view of a partition member forming part of the valve structure.

On the accompanying drawing I have used the reference numeral 10 to indicate a cupped valve body. It is formed of sheet metal, being drawn in suitable dies to the cup shape shown which includes a diaphragm flange 24 therearound.

The valve body 10 is provided with an inlet opening 12 and an outlet opening 14 in opposite walls as shown in Figure 2. An inlet fitting 16 is associated with the inlet opening 12 and an outlet fitting 18 is associated with the outlet opening 14. These fittings may be formed of solid bar stock of square or hexagonal cross-section and shouldered as at 20 to fit into the openings 12 and 14, as shown at the right side of Figure 2. After they are fitted in position, they are peened and/or staked as indicated at 22 to retain them in position. Thereafter they are brazed or silver soldered in position as indicated at 23 (for the fitting 16) so that they become an integral part of the valve body 10. The fitting 18 is illustrated prior to peening and brazing.

Within the valve body 10, a partition 26 is provided. This is formed of sheet metal of the shape shown in Figure 3, with a vertical wall 27, a slanting wall 28, and a horizontal wall 29. The wall 26 is perforated with a valve seat opening 30.

The partition 26 is brazed or silver soldered in position as indicated at 31 whereby it also becomes an integral part of the valve body. A valve seat ring 32 is provided of the cross-sectional shape shown in Figure 2 and this is brazed or silver soldered in position as indicated at 33, thereby also becoming an integral part of the valve body. The ring 32 is preferably finished on its upper surface in Figure 2 to serve as an accurate valve seat, this being done prior to brazing or soldering the ring in position.

A valve gate 34 is adapted to seat against the valve seat ring 32 as shown in the dotted position of Figure 2, or to be opened with respect thereto as shown in the solid line position. The valve gate is pivoted as at 36 to ears 38 extending upwardly from the partition 26.

A diaphragm 40 spans the open top of the valve body and is located on the diaphragm flange 24 and secured thereto by a diaphragm cover 42 and screws 44 through the cover and threaded into the flange 24, as illustrated in Figure 2. Metal discs 46 are secured to opposite surfaces of the diaphragm 40 as by means of a rivet 48, and ears 50 depend from the lower disc. Ears 52 extend upwardly from the valve gate 34, and the ears 50 are connected with the ears 52 by a link 54 which may consist of a wire with right angle bends 55 and 56 extending through the ears 50 and 52 respectively.

The diaphragm cover 42 is provided with an opening 58 for control purposes. Diagrammatically in Figure 2 I have illustrated a pilot valve 60 for this purpose, which is connected with a source of gas supply 62 and a bleed 64. 62 may connect with the same supply that is fed to the inlet fitting 16 and the bleed 64 may extend to the burner chamber to discharge thereinto adjacent the burner that is connected with the outlet fitting 18. A connection 66 leads from the pilot valve 60 and through the opening 58 to a diaphragm chamber 68 within the diaphragm cover 42 above the diaphragm 40.

Practical operation

In the operation of the valve structure disclosed, the parts are normally in the position shown in Figure 2. This is the operating position in which gas is flowing from the inlet fitting 16 through the valve seat ring 32 and out of the outlet fitting 18 to the burner in a gas furnace or the like. Since the pilot valve 60 is in the position for the main valve to be "Open" as indicated by an arrow head pointer and the legend adjacent the valve 60, the gas pressure under the diaphragm 40 is holding it in the raised position since the diaphragm chamber 68 is bleeding to atmosphere through 66 and 64. As long as the pilot valve remains in this position, the valve gate 34 will remain open in the full-line position illustrated.

Whenever the pilot valve 60 is moved to the "Main Valve Closed" position (the main valve of course being 10—16—18) or opposite that shown in Figure 2, gas from the line 62 will pass through 66 and 58 into the chamber 68 so that thereupon the gas pressure therein is balanced with respect to the pressure under the diaphragm, or predominates the pressure thereunder because the main valve is open to the atmosphere through the burner, and the valve gate 34 will accordingly close to the dotted position illustrated. It will remain in this position due to the weight of the valve gate 34 and the diaphragm discs 46 in addition to the gas pressure from the inlet 16 against the top of 34 until such time as the pilot valve 60 is reversed to the solid line position shown in Figure 2.

The pilot valve 60 may be operated manually or by means of an electro-magnet or the like. The design of the valve is such that it is efficiently operated by the gas pressure supplied to the valve when controlled by the pilot valve 60. The valve structure is comparatively simple and small as well as being compact, yet the design is such that a large volume of gas may flow therethrough when the valve is open and the fabricated construction insures that there will be no gas leakage through porous castings or the like as sometimes encountered in both cast and die cast types of valve bodies.

Some changes may be made in the construction and arrangement of the parts of my valve structure without departing from the real spirit and purpose of my invention, and it is my intention to cover by my claims any modified forms of structure or use of mechanical equivalents which may be reasonably included within their scope. Where said claims refer to "brazed" connections it is to be understood that the term is to be construed broadly enough to encompass silver soldered connections also.

I claim as my invention:

1. In a fabricated valve structure, a body formed of a sheet metal stamping, said body being cup-shaped and being provided with an open top surrounded by an outturned flange which is an integral part of said sheet metal stamping, opposite ends of said body having openings therethrough, inlet and outlet fittings mounted in said openings and having shoulders against the outer surface of said stamping, said fittings being brazed with respect to said valve body, a partition formed of sheet metal and brazed in position in said valve body, said partition having a slanting wall provided with an opening therethrough, a shouldered valve ring brazed in position in said opening of said slanting wall, a diaphragm, a diaphragm cover, said diaphragm and diaphragm cover being secured to said flange to close the open top of said body, a valve gate for seating on said valve ring, a link connection having its ends pivoted to said valve gate and said diaphragm, respectively, and an opening in said diaphragm cover for introducing gas pressure thereto or bleeding gas pressure therefrom.

2. In a fabricated valve structure, a body formed of a sheet metal stamping, said body being cup-shaped, being substantially rectangular in both vertical and horizontal cross section and being provided with an open top surrounded by a flange which is an integral part of said sheet metal stamping, opposite, substantially flat ends of said body having openings therethrough, inlet and outlet fittings mounted in said openings and having shoulders engaging said stamping, said fittings being brazed with respect to said valve body, a substantially rectangular partition formed of sheet metal and brazed in position in said valve body, said partition having a slanting wall provided with an opening therethrough, a shouldered valve ring brazed in position in said opening of said slanting wall, a diaphragm, a diaphragm cover, said diaphragm and diaphragm cover being secured to said flange to close the open top of said body, a valve gate for seating on said valve ring, a link connection between said valve gate and said diaphragm, and an opening in said diaphragm cover for introducing gas pressure thereto or bleeding gas pressure therefrom.

References Cited in the file of this patent

UNITED STATES PATENTS

| | | |
|---|---|---|
| 282,069 | Frost | July 31, 1883 |
| 381,055 | Creelman | Apr. 10, 1888 |
| 1,359,198 | Reyfield | Nov. 16, 1920 |
| 1,505,217 | Powell | Aug. 19, 1924 |
| 2,262,825 | Welliver | Nov. 18, 1941 |
| 2,363,943 | Carlson | Nov. 18, 1944 |
| 2,418,447 | Arbogast | Apr. 8, 1947 |
| 2,531,824 | Paille | Nov. 28, 1950 |

FOREIGN PATENTS

| | | |
|---|---|---|
| 1,072 | Great Britain | 1857 |
| 551,874 | Great Britain | 1943 |